J. HOBBS.
RAIN STAFF SCREW FOR SHIP CARPENTERS.
No. 12,316.             Patented Jan. 30, 1855.
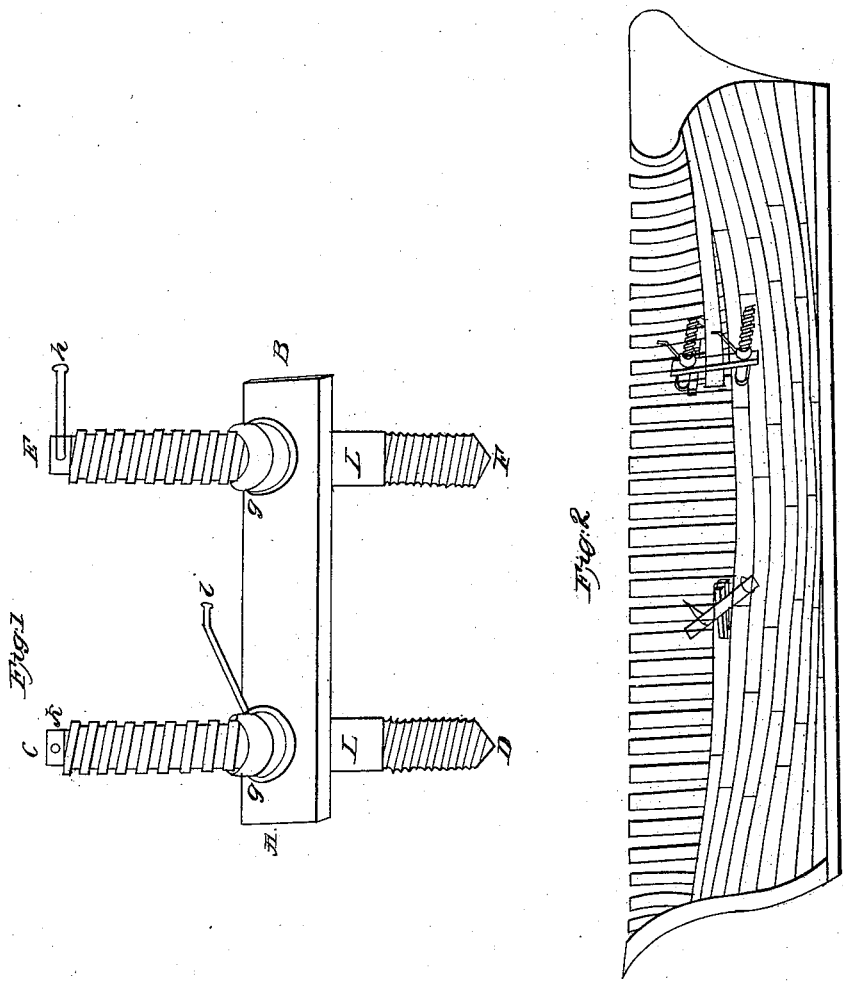

UNITED STATES PATENT OFFICE.

JOHN HOBBS, OF HALLOWELL, MAINE.

RAIN-STAFF SCREW FOR SHIP-CARPENTERS.

Specification of Letters Patent No. 12,316, dated January 30, 1855.

*To all whom it may concern:*

Be it known that I, JOHN HOBBS, of Hallowell, in the county of Kennebec and State of Maine, have invented a new and Improved Rain-Staff-Screw to be Used in Forcing Plank into Place on the Sides of Vessels for the Purpose of Being Spiked to the Timbers; and I hereby declare that the following is a full and exact description of said invention.

The invention consists in the application of the power of screws to the rainstaff in the manner exhibited in the drawing and described below.

A B, in the drawing, represents a plank, commonly called by ship builders a rainstaff. It is perforated with a hole near each end. Into these holes are inserted the stems of the screws, C D and E F. Each of these stems has a sharp threaded screw cut on one end, which is intended to enter the timber or side of the vessel.

$k$ represents a hole in the other end of the stem, to admit a lever $h$, by means of which the screws above mentioned are turned and forced into the timber or side of the vessel, where they then become stationary or self-holding.

On the upper or outer ends of the stems, C and E, are cut square threaded screws, on which move the nuts $g$ $g$, turned by the lever $i$, for the purpose of forcing the rainstaff, and by means thereof one end of the shipping plank, toward the side of the vessel, to bring the plank into place for being spiked and made fast.

L L represent the central portion of the stem, on which no screw is cut. This portion is used as a "set down," as it is called by ship carpenters. Its use will be best seen by a reference to Figure 2 in the drawing. It will be there seen that the "set down" is used for the insertion of wedges between it and the edge of the plank to be operated upon, to set the plank down (or up, as the case may be) into its proper place for being spiked and secured.

In Fig. 2, on the left hand, may be seen the rainstaff as now used by ship builders without any screw, fastened at the lower end by a ring bolt, and at the upper end by a rope or chain passed round one of the timbers. It is usually worked by the driving wedges between the rainstaff and the plank to be operated upon. On the right hand, in the same figure, may be seen the operation of the subscriber's rainstaff screw. The sharp threaded screws being forced into the timber or side of the vessel, with one end of the plank to be operated upon between the rainstaff and the vessel, by turning the nuts $g$ $g$ by means of the lever $i$, the rainstaff and plank are forced toward the side of the vessel, and by driving wedges between the edge of the plank and the "set down" on the stem above or below, the plank is easily and expeditiously brought into its proper place for being spiked to the vessel.

What I claim as my invention and desire to secure by Letters Patent, is—

The arrangement of the screw stems C D and E F, passing through the rainstaff A B, the sharp threaded screws D and E forced into the timber or side of the vessel by the lever $h$ inserted in the aperture $k$, and the nuts $g$ $g$ moved by the lever $i$, to force the rainstaff toward the vessel, together with the set down L on each screw for the purpose of inserting wedges between it and the edge of the plank, to bring the plank into place for spiking on the side of the vessel.

JOHN HOBBS.

Witnesses:
H. K. BAKER,
THOMAS HOVEY.